US012587022B2

(12) United States Patent
Singer et al.

(10) Patent No.: US 12,587,022 B2
(45) Date of Patent: Mar. 24, 2026

(54) BATTERY STORAGE SYSTEM WITH MULTI-LEVEL CONVERTER AND MULTIPLE STORAGE SECTIONS

(71) Applicant: STABL Energy GmbH, Munich (DE)

(72) Inventors: Arthur Singer, Munich (DE); Rene Radojčić, Munich (DE)

(73) Assignee: STABL Energy GmbH, Munich (DE)

( * ) Notice: Subject to any disclaimer, the term of this patent is extended or adjusted under 35 U.S.C. 154(b) by 584 days.

(21) Appl. No.: 17/986,476

(22) Filed: Nov. 14, 2022

(65) Prior Publication Data

US 2023/0071601 A1 Mar. 9, 2023

Related U.S. Application Data

(63) Continuation of application No. PCT/EP2021/063665, filed on May 21, 2021.

(30) Foreign Application Priority Data

May 23, 2020 (DE) ..................... 10 2020 003 060.2

(51) Int. Cl.
 *H01M 10/44* (2006.01)
 *H01M 10/42* (2006.01)
 (Continued)

(52) U.S. Cl.
 CPC ......... *H02J 7/0045* (2013.01); *H01M 10/425* (2013.01); *H01M 10/482* (2013.01);
 (Continued)

(58) Field of Classification Search
 CPC .... H02J 7/0045; H02J 7/00032; H02J 7/0047; H02J 7/0036; H02J 7/0013; H02J 7/0016;
 (Continued)

(56) References Cited

U.S. PATENT DOCUMENTS 6,580,249 B2 6/2003 Yau et al.
9,537,328 B2 1/2017 Kim
 (Continued)

FOREIGN PATENT DOCUMENTS

EP 2704247 A2 3/2014
JP 2016517258 A 6/2016

OTHER PUBLICATIONS

PCT International Search Report and Written Opinion, PCT/EP2021/063665, Jul. 26, 2021, 13 pages.

*Primary Examiner* — Edward Tso
(74) *Attorney, Agent, or Firm* — Quarles & Brady LLP; Yakov S. Sidorin

(57) ABSTRACT

A battery storage system includes a multilevel-converter and a plurality of storage sections. Each storage section includes at least one holding means configured to hold at least one battery and at least one cable with at least one connector configured to electrically connect at least one of the batteries. The multilevel-converter includes a plurality of converter modules connected in series with each other and each converter module has at least one bypass switch configured to bypass the converter module and a battery switch configured to disconnect the battery at the same time when the bypass switch is on. The battery storage system further includes a controller with means for detecting the presence of a battery in each storage section and means for configuring the switches of the plurality of converter modules based on the presence of batteries such that the plurality of converter modules provides a required voltage.

16 Claims, 13 Drawing Sheets

(51) Int. Cl.

| | |
|---|---|
| *H01M 10/46* | (2006.01) |
| *H01M 10/48* | (2006.01) |
| *H01M 50/204* | (2021.01) |
| *H01M 50/249* | (2021.01) |
| *H01M 50/519* | (2021.01) |
| *H02J 7/00* | (2006.01) |

(52) U.S. Cl.
CPC ....... *H01M 50/204* (2021.01); *H01M 50/249* (2021.01); *H01M 50/519* (2021.01); *H02J 7/00032* (2020.01); *H02J 7/0013* (2013.01); *H02J 7/0036* (2013.01); *H02J 7/0047* (2013.01); *H01M 2010/4271* (2013.01); *H01M 2220/20* (2013.01); *H02J 2207/20* (2020.01)

(58) Field of Classification Search
CPC ............. H01M 10/482; H01M 50/204; H01M 2010/4271
USPC ................. 320/107, 114, 115, 116, 118, 122
See application file for complete search history.

(56) References Cited

U.S. PATENT DOCUMENTS

| | | | | |
|---|---|---|---|---|
| 10,305,298 | B2 | 5/2019 | Kristensen | |
| 2011/0080138 | A1* | 4/2011 | Nakanishi ............. | H02J 7/0016 |
| | | | | 320/116 |
| 2012/0268069 | A1* | 10/2012 | Park ................... | H01M 10/425 |
| | | | | 320/116 |
| 2014/0097797 | A1 | 4/2014 | Hendrix et al. | |
| 2019/0103750 | A1* | 4/2019 | Kristensen ......... | H01M 10/441 |

* cited by examiner

BATTERY STORAGE SYSTEM WITH MULTI-LEVEL CONVERTER AND MULTIPLE STORAGE SECTIONS

CROSS-REFERENCE TO RELATED APPLICATIONS

This application is a continuation of International Application No. PCT/EP2021/063665 filed on May 21, 2021 and now published as WO 2021/239620, which designates the United States and claims priority from German Application No. 10 2020 003 060.2 filed on 23 May 2020. The disclosure of each of the above-identified applications is incorporated by reference herein.

BACKGROUND

1. Field of the Invention

The present invention relates to an energy storage system based on batteries. It may be based on second-life electrical vehicle batteries.

2. Description of Related Art

There is an increasing market for equipment for reusing used batteries. Thus, batteries which were already used, e.g., in electric vehicles and do no longer have the full capacity may further be used for power-grid stabilization. For this purpose, multiple types of batteries should be usable in a battery storage system. Further, it may be beneficial to allow for easy exchange of the individual batteries, for example if they reach end of life or if they are defective. Further, the battery storage system should be operable with a variable number of batteries and preferably, even if batteries are provided at random storage places.

EP 2 704 247 A2 discloses a battery rack with an integrated cooling system. Such a rack may store many batteries and may provide a cooling of the batteries at the same time.

SUMMARY

The embodiments provide a flexible battery storage system which may employ a variable number of batteries, and which can easily be exchanged. Further, it may allow to use different types of batteries which may for example have different battery voltages and/or different capacities.

In an embodiment, a battery storage system may include a multilevel converter combined with a plurality of storage sections. Each of the storage sections may include means for holding at least one battery module. Such a holding means may include a mechanical support which may be a set of rails, wheels or a tray or any other suitable means. The holding means may further include means for affixing or securing the battery to the battery module to the storage sections. Further, each storage section may include at least one cable with at least one connector which are configured for electrically connecting at least one of the batteries. A cable may also be configured for connecting multiple batteries in a storage section. The cable may have a cross-section sufficient for a battery current, and an insulation sufficient for the battery voltage. The cable connector may be a standard battery connector either of a plug or socket type. It may be a single-pole or multi-pole connector. Alternate battery connectors may be cable shoes or simple un-insulated wire ends.

The multilevel converter includes a plurality of modules which are connected in series with each other such that they may form a string of modules. Each of the modules includes at least two switches: A bypass switch which is configured to bypass the module, and a battery switch which is configured to disconnect the battery at the same time when the bypass switch is ON. This configuration results basically in two switching states. In an ON-state of the module, the bypass switch is open, and the battery switch is closed, such that the battery is included in the string. In an OFF state, the bypass switch is closed, and the battery switch is open, such that the battery is disconnected from the string and the current flow through the string is maintained by the bypass switch.

The battery storage system may further include a controller which has means for detecting the presence of a battery in each battery module. As it may be possible to use different types of batteries which further have different voltages, different capacities and different current capabilities, the controller may be configured for determining health data and/or operational data, e.g. at least one of a battery voltage, a battery capacity, a state of health, a temperature, a current a voltage, cell information, and further information, e.g. make, type, manufacturing date, operating hours, charge cycles etc. Such information may be gathered directly, e.g., by measuring a battery voltage or indirectly e.g., by querying a battery controller or a battery management system in the battery.

The controller may further include means for configuring the switches in the modules, such that the modules may either be switched ON or OFF. The modules may also be configured for other states, if available. Configuration of the switch states is made based on the presence of batteries, such that the plurality of modules provides a required voltage over the string.

A reliable operation of the battery storage system is only possible if the controller has information about the presence of a battery in a battery module. Only if a battery is present, a module may be switched into an ON-state. Otherwise, it must be in an OFF state, such bypassing the module.

In a further embodiment, at least one module may have different ON-states. In a first positive ON-state, the battery may be connected in a positive or forward direction with respect to the preceding and the following battery, such that the negative pole of the battery is connected to the positive pole of the preceding battery, and the positive pole of the battery is connected to the negative pole of the following battery. In a negative ON-state, the battery may be connected with a reversed polarity, such that their positive pole is connected to the positive pole of the preceding battery, and the negative pole is connected to the negative pole of the following battery. Whereas a positive ON-state will increase the voltage of the string for the battery voltage, a negative ON-state will de-crease the voltage of the string for the battery voltage. There may also be ON-states where a plurality of batteries are connected in parallel. In such an ON-state the total current may be higher, or the individual load of a battery may be lower.

In an embodiment, at least one means of the detecting the presence of a battery may include a voltage measurement means which may measure the battery voltage. This means may only provide a battery presence signal if a certain minimum battery voltage is exceeded. Further, it may require that the battery voltage is below a maximum battery voltage. The means of detecting the presence of a battery may further include a weight detection means which may be configured to detect the mass of a battery. This may be a mechanical switch which may be triggered if a battery is placed on the switch. It may also be a strain gauge or any mass-detecting device which may give an estimate about the size and the capacity of the battery. There may also be a volume detection means which may be configured to detect a battery volume. This may also be a mechanical switch which is triggered by a battery protruding into the proximity of the switch. It may also be a volume or distance measurement device. If the volume of a battery is known, this may also provide an indication of the capacity of the battery. There may also be an optical detection means which is configured to detect a battery appearance, which may for example be a size or a color, or a marking of the battery, like a bar code, a QR code or any other coding. This may also give an indication about the specific type of battery.

This embodiment allows a very flexible configuration of the battery storage system. It is not required that each storage section is occupied by a battery which is further connected to the cabling. It is only necessary that there are sufficient batteries available, which means in place and connected to reach a required string output voltage. The battery storage system may be dynamically populated with batteries by simply adding batteries and connecting them. The controller may then detect the battery's presence and include it if required into the multilevel converter switching sequence. Basically, new batteries may be inserted even under a full load of the multilevel converter, as in an unoccupied position of a storage section, the associated module is in an OFF-position. For removing a battery, an indication must be made to the controller, such that it switches the corresponding module to an OFF state. This may be made via a software command, by a manual switch, or an automatic switching device like a position detector, a presence detector, or by the battery presence detector itself.

The storage sections may include a plurality of mechanical means for holding at least one battery or a plurality of batteries. These may be guide rails, drawers, rolls, or other means which may support the batteries and/or simplify pushing batteries into the storage section or pulling them out of the storage section. There may also be a lifting device to lift the batteries into the correct height of a storage section.

The storage sections may further provide means for centering and/or aligning of the batteries. They may further include means for holding or affixing the batteries within a storage section. There may also be mechanical dampers or shock absorbers to reduce mechanical load when a battery is inserted or removed, which may for example be caused by a battery reaching the end of a battery rail.

There may be a mechanical feedback, if a battery has been correctly inserted into a storage section. Further, there may be an indication that the controller has detected the presence of a battery, for example by software on a screen, a display panel, or at an App. In that way, further defective batteries may be indicated.

The storage section may also include at least one connector which is mechanically held in a fixed position matching to a specific battery type, such that these are automatically connected to the battery, when the battery slides into the storage section.

The at least one cable and the at least one connector may include cables and/or connectors for at least one communication interface to communicate data with the battery. By this communication, the controller may for example receive data from the battery indicating the type and make of the battery, the age of the battery, the capacity, the voltage, and other electrical characteristics as well as state of health or state of charge. Further, the controller may set the battery into specific operational states.

The connector may have electrical protection devices to prevent the connector from being touched by a person. Such protection devices may automatically be removed or opened when a battery is inserted into a storage section. The connector may have contacts with different lengths, such that for example a leading contact establishes an electrical contact first before a trailing contact when inserting a battery into the storage section.

The battery storage system and/or a storage section may also include means for cooling the battery and/or means for cooling the modules of the multilevel converter.

In an embodiment, the battery storage system has a modular design, such that for example a plurality of storage sections may be combined with each other and may for example included into a common rack.

Such a common rack may also provide means for cabling and connecting the storage section similar to the means for cabling and connecting the batteries.

In an embodiment, the modules of the multilevel converter may be mechanically included into the storage sections, or they may be mounted separately. In a further embodiment, a module may be integrated into a battery.

If there are sufficient batteries provided in the battery storage system, failure of individual batteries would not affect the function of the battery storage system, as the controller may use other batteries to switch into the string and to generate the required output voltage. For generating a sinusoidal output voltage, the maximum string voltage comprising of the sum of battery voltages included in a string is $\sqrt{2}$-times the AC-voltage which is the same as the AC peak voltage. For an optimum reliability, a high number of batteries may be provided. For example, there may be a minimal number of modules to obtain the output voltage plus the number of expected failed modules per year, divided by the number of maintenance intervals per year. To increase reliability, the number of additional modules may be multiplied by 2.

A method of operating a battery storage system including a multilevel converter and a plurality of storage sections, may include the following steps:

a) assigning at least one converter module to at least one storage section, b) switching all converter modules to an OFF state, c) identifying storage sections occupied with at least one battery, d) getting battery data including at least a battery voltage of storage sections having a battery, e) checking whether the total voltage of all storage sections with at least one battery exceeds a required minimum output voltage, f) then starting with multilevel converter operation, e.g., generation any required output voltage or waveform, e.g., a sinusoidal output voltage, by selectively switching individual converter modules into ON or OFF states g) else stopping or going to any of steps ac.

In an embodiment, after starting with multilevel converter operation in step f) the method is performed periodically from step c) during multilevel converter operation (that is, a loop including steps c) through f) is performed periodically). This allows to maintain multilevel converter operation while checking for changes in the batteries and integrating new batteries as well as removing batteries.

An embodiment includes querying periodically and/or checking periodically at least one means for detecting the presence of at least one battery in a storage section, and if a status of a storage section changes from present to absent, immediately setting the converter module of that storage section to an OFF state.

If a battery presence detector, e.g., a switching means, is set to an absent state at a storage section, the converter module of that storage section is immediately set to an OFF state to allow for safe removal of any battery in the storage section.

Another embodiment of the method of operating a battery storage system includes further the steps of querying periodically and/or checking periodically at least one operating (operational) parameter of the battery storage system including at least one of a state of health, a state of charge, a voltage, a temperature and a current, and if (or when) at least one of the operating parameters falls out of predetermined limits, setting the converter module of that storage section to an OFF state.

Herein, the general term of battery is used. This term may also refer to battery modules which may be used in most cases. Also, the term battery refers to an energy storage device in a very broad sense which may include rechargeable battery cells. Such battery cells may include Lithium technologies, like LiPo, LFP, NMC, NCA, Li-Titanate, or further solid body batteries or lead-sulfur based batteries.

A battery module normally is a system which may be encapsulated and includes at least two batteries connected to each other in a common housing. Examples are batteries which may be used in laptops or battery modules of electrical vehicles. Battery modules may have voltages starting from 12 Volts at small systems, over 24 to 60 Volts, up to 400 Volts at electrical vehicles.

BRIEF DESCRIPTION OF THE DRAWINGS

In the following, the invention will be described by way of example, without limitation of the general inventive concept, on examples of embodiment and with reference to the drawings.

Figure 1:
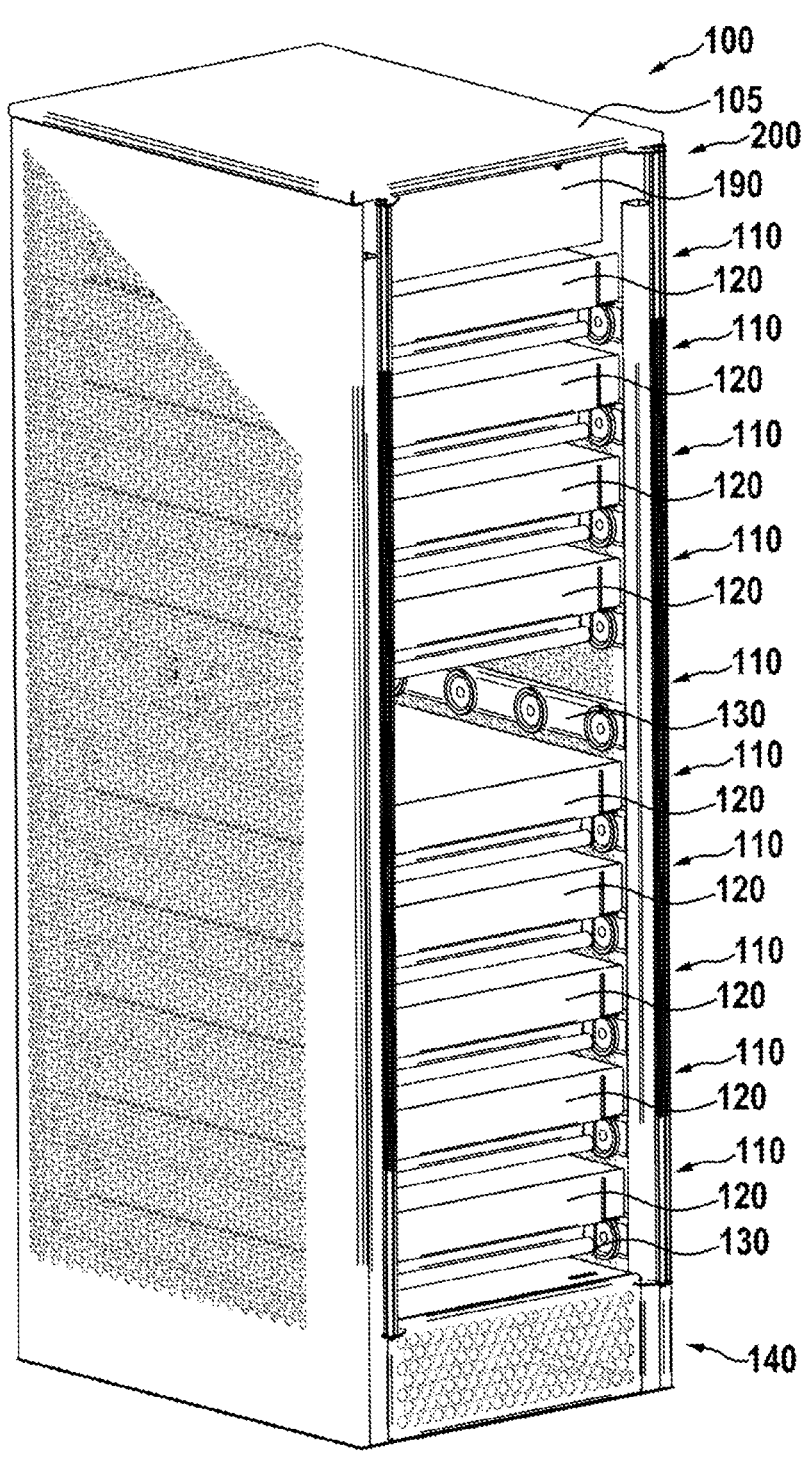
FIG. 1 shows a battery storage system.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

In FIG. 1, a battery storage system 100 is shown. The battery storage system 100 may include a rack 105 which may further hold a plurality of storage sections 110. Here, the storage sections are shown within a rack, but they may be arranged in any different way, for example a storage section may be a position, or a container positioned on a building floor or even outdoors. Basically, a storage section provides means for holding at least one battery 120.

In an embodiment, where a battery storage system 100 includes a rack 105, the converter modules may be arranged in the rear of the rack or at the sides of the rack. This gives a free access to the batteries. Alternatively, the converter modules may be arranged in a front door of the rack. This would give a free access to the batteries when opening the door and would at the same time provide short and easily accessible cabling to the batteries. Further, the converter modules may be arranged in in a separate module between the front door and the batteries—which then may be held by hinges to allow access to the batteries.

The term "battery" is used in a very broad sense. A battery may include a single battery cell, a plurality of battery cells, or a battery module. In most applications, battery modules are used, because they provide a convenient housing for a plurality of battery cells. Often, a battery module includes at least a minimum battery management system which may monitor essential battery characteristics, like output voltage, temperature, current, etc.

There may be at least one holding means for holding at least one battery. The holding means may have a very general structure, or they may be specifically adapted to a specific type of battery. A very general type of holding means may be a space on a concrete floor. A more specific holding means may be straight slides in a 19 Inch rack, and battery-specific holding means may be specific slides adapted to a specific type of battery module. There may also be wheels or linear bearings for supporting large mechanical loads as being caused by heavy batteries. These may simplify insertion and/or removal of heavy batteries. Such specific holding means may further include a specific plug and/or socket connector to connect a battery when it is inserted into the storage section.

A storage section 110 may include at least one electrical connection means 140, which is configured for electrically the at least one battery 120. The connecting means 140 is not shown in this Figure, because it is hidden by other structures. Basically, an electrical connection means may be a wiring, cabling, together with a connector. It may also include current bars or printed circuit boards. Basically, a connector may be any known plug and socket connector, it may also include a screw connector, like cable shoes or a screw connection to a current bar. Basically, the electrical connection means may allow to connect a battery to the battery storage system and to disconnect the battery if required, for example for exchanging the battery. Furthermore, the battery connector system may be configured to connect a single battery or a plurality of batteries within a storage section.

For example, a plurality of battery modules or battery cells may be switched in parallel or in series or in any other configuration within a storage section.

As shown in this Figure, not every storage section must be occupied with a battery. In the embodiment shown, ten storage sections 110 are provided, and only nine of them are occupied by batteries. Generally, the battery storage system will work with any number of batteries above a minimum number of batteries. Batteries may be dynamically inserted into and/or removed from the battery storage system, as long as the required minimum number of batteries is reached.

Figure 2:
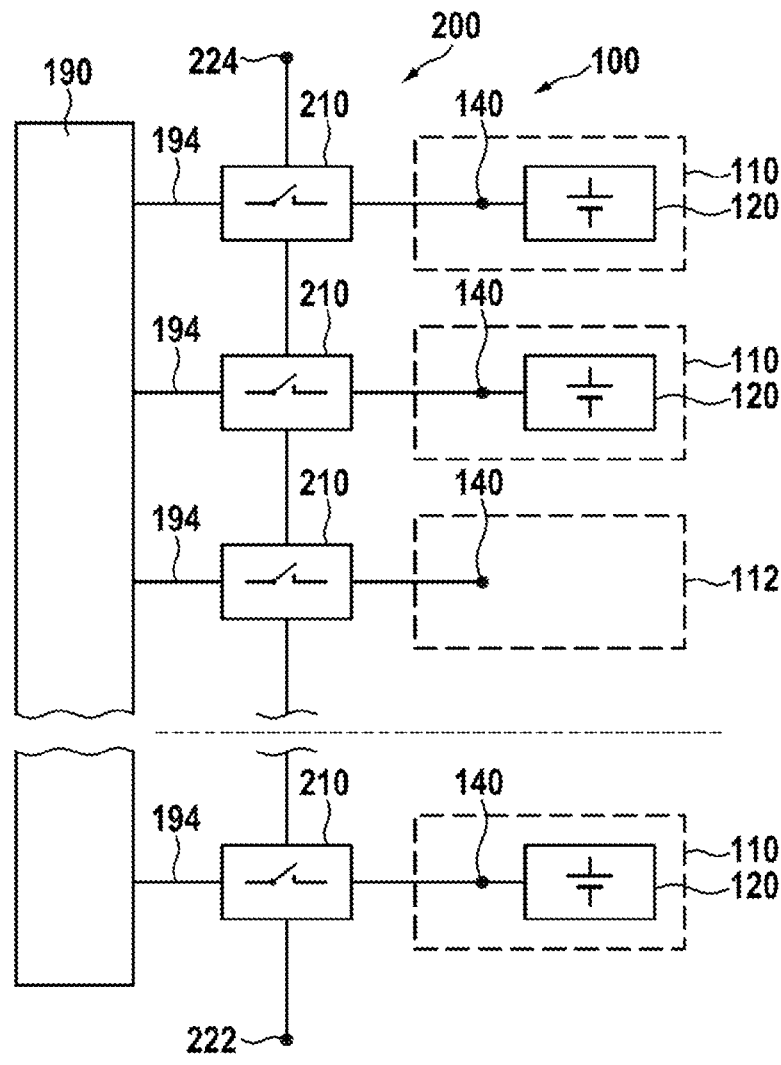
FIG. 2 shows a block diagram of a battery storage system.

In FIG. 2, a block diagram of a battery storage system is shown. The battery storage system 100 includes a multilevel converter 200, which further includes a plurality of converter modules 210. These converter modules 210 are electrically connected in series to provide a voltage and a current between a first port 222 and a second port 224. Each output voltage is associated with a storage section 110. Each of the storage sections 110 may contain a battery 120. There may also be empty storage sections which do not contain a battery, like storage section 112 which may be of the same type as the other storage sections 110, but it is not loaded with a battery. The batteries 120 may be connected by electrical connection means 140 to an associated converter module 210. A controller 190 is connected to each of the converter modules 210 and issues control signals to the converter modules 210 via signal lines 194.

Figure 3:
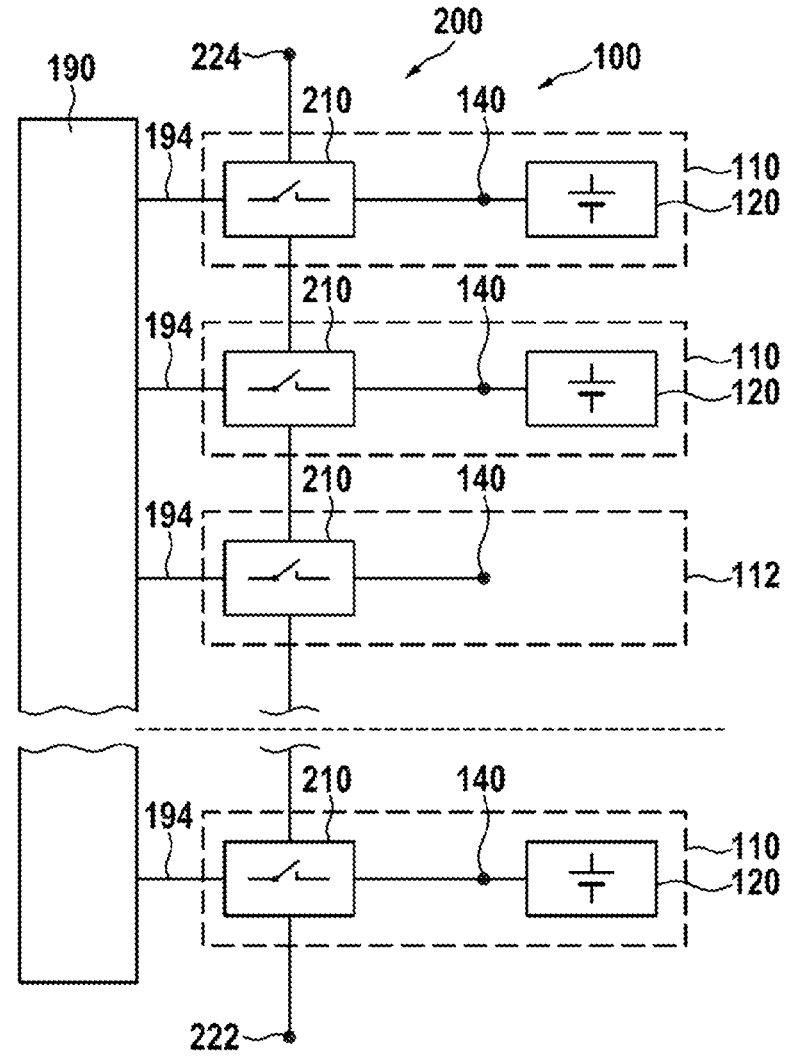
FIG. 3 shows a modified embodiment.

In FIG. 3, a modified embodiment of a battery storage system 100. Here, the converter modules 210 are included into the storage sections 110. This results in a very compact and modular design of the battery storage system. The function remains basically the same as described above.

Figure 4:
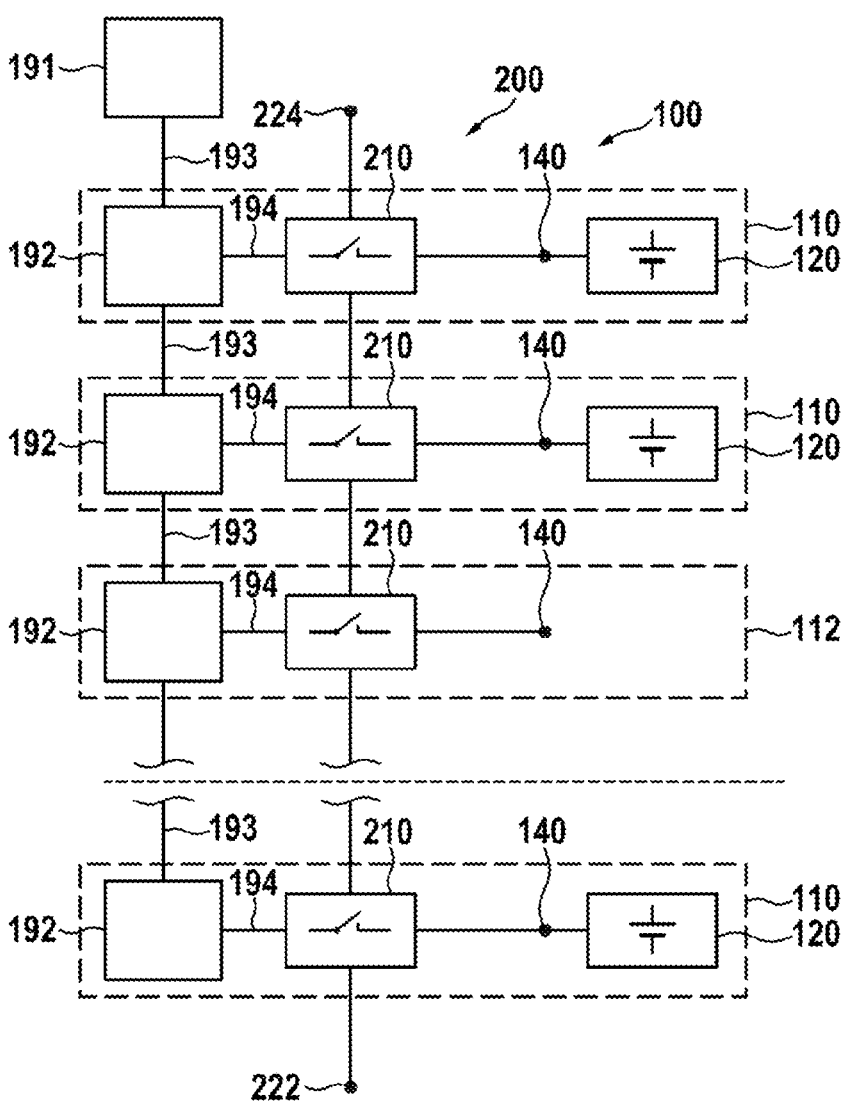
FIG. 4 shows another embodiment.

In FIG. 4, another embodiment of a battery storage system 100 is shown. Here, the controller 190 is split into a plurality of sub-controllers which are part of the storage sections. Accordingly, each storage section includes a sub-controller 192 which communicate with a master controller 191. The sub-controllers 192 may also communicate with each other. Communication may be done via a standard network or bus system.

In general, any controller, e.g., the master controller and/or a sub controller may communicate with a battery management system included in a battery.

Generally, there may be different combinations of devices in one or more common housings. For example, each converter module may have its own housing. There may also be a sub controller included with a converter module in a common housing. Further a storage section may have a separate housing, which may further include a converter module and/or a sub controller.

Figure 5:
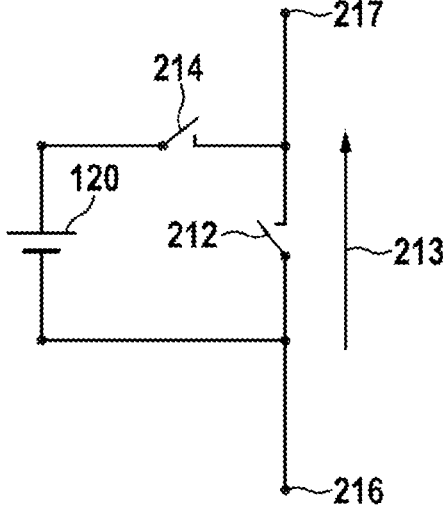
FIG. 5 shows a basic converter module in an OFF-state.

In FIG. 5, a basic converter module 210 is shown in an OFF-state. Here, the bypass switch 212 is closed and the battery switch 214 is open, such that the battery is disconnected, such that a bypass current 213 between a first module port 216 and a second module port 217 may flow. The current may also flow in an opposite direction as indicated.

Figure 6:
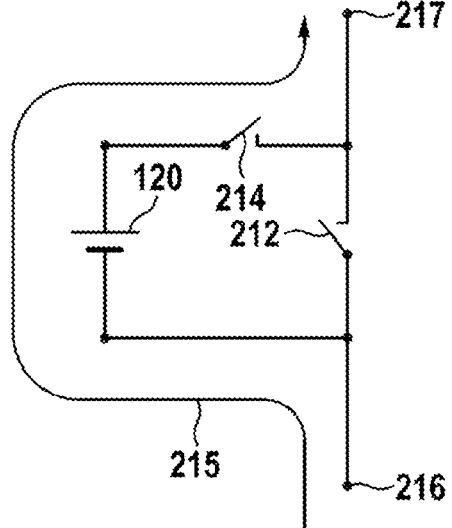
FIG. 6 shows a basic connector module in an ON-state.

In FIG. 6, a basic connector module 210 in an ON-state. Here, the bypass switch 212 is open and the battery switch 214 is closed, such that the battery 120 is included in the current path and a battery current 215 between a first module port 216 and a second module port 217 may flow through the battery. In this case, as indicated by the arrow the battery current 215, the battery may be discharged and provide power to an external load. The current may also flow in the opposite direction for charging the battery 120 from an external source.

These Figures show only the minimum requirement of a converter module. The converter module must be able to provide an ON-state where a battery is included in the current path, and an OFF-state where the battery is switched OFF, but a current flow is still maintained. This may also be done by other more complex switching topologies which may not include only two switches, but three, four, five, six, or more switches. These more complex topologies often provide a plurality of further ON-states, where for example batteries may be switched in series or anti-series or in parallel to another battery. Generally, in such ON-states there is a power exchange with a battery, which means that the battery is either charged or discharged, whereas in an OFF-state, the converter module behaves passive and simply acts in conducting a current without delivering or consuming power.

Figure 7:
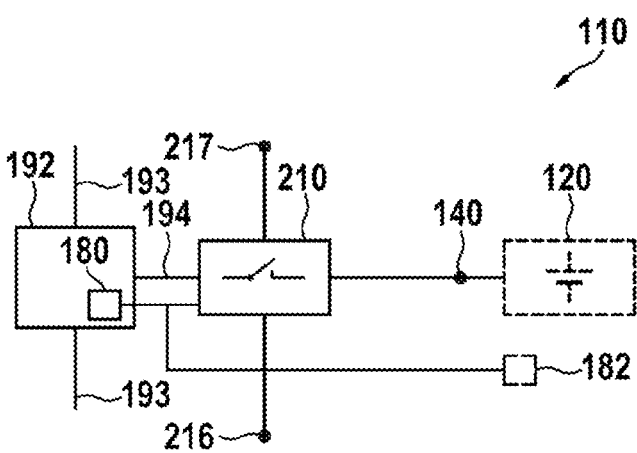
FIG. 7 shows a storage section in more detail.

In FIG. 7, a storage section 110 is shown in more detail. Here, for simplification a storage section including a converter module 210 and a sub-controller 192 is shown. Basically, the same concept works also with all other embodiments and modifications as shown herein. Each storage section 110 includes a converter module 210 which may have a first module port 216 and a second module port 217 for connection with further converter modules 210 of further storage sections 110. There may also be a sub-controller 192 which may communicate by communication lines 193 with other sub-controllers and/or a master controller. The storage section 110 may further provide an electrical connection means 140 configured to connect a battery to the converter module 210. Here, the battery is drawn dashed to symbolize that the battery is optional. The sub-controller 192 includes a means 180 for detecting the presence of a battery. This means may be configured to measure the voltage across the battery or it may detect the presence of the battery by a physical or optical detection. Such a means may be a sensor 182 which may be a mechanical switch, a weight sensor, a light sensor, a temperature sensor, or a voltage or current sensor. It may also receive battery voltage information from the converter module 210.

Figure 8:
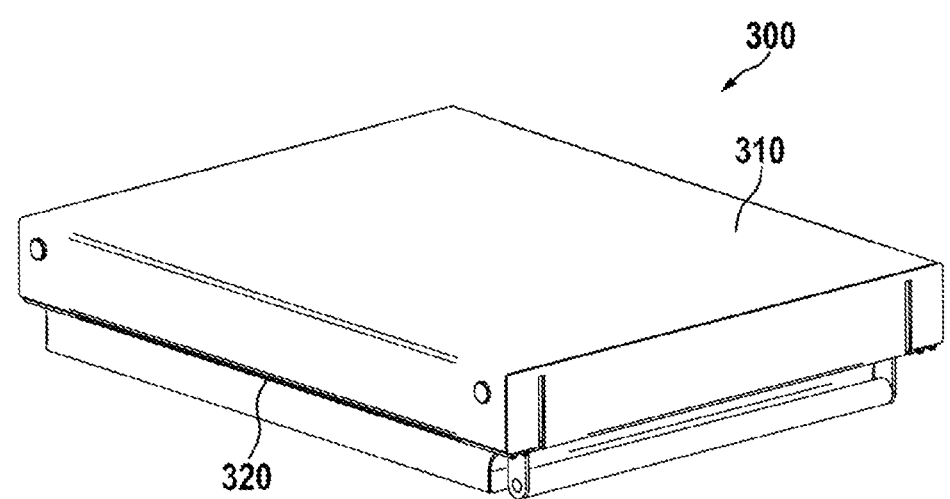
FIG. 8 shows a battery module.

In FIG. 8, a battery module 300 is shown, which may be inserted into a storage section 110. Actually, the batteries 120 as shown in FIG. 1 may be held in a battery module 300 as shown. The battery module 300 may include a housing 310, which normally would be comparatively rigid, as it may have to bear a large weight of a number of battery cells. The housing may include sliding rails 320 or wheels which may allow sliding of the housing into a storage section 110.

Figure 9:
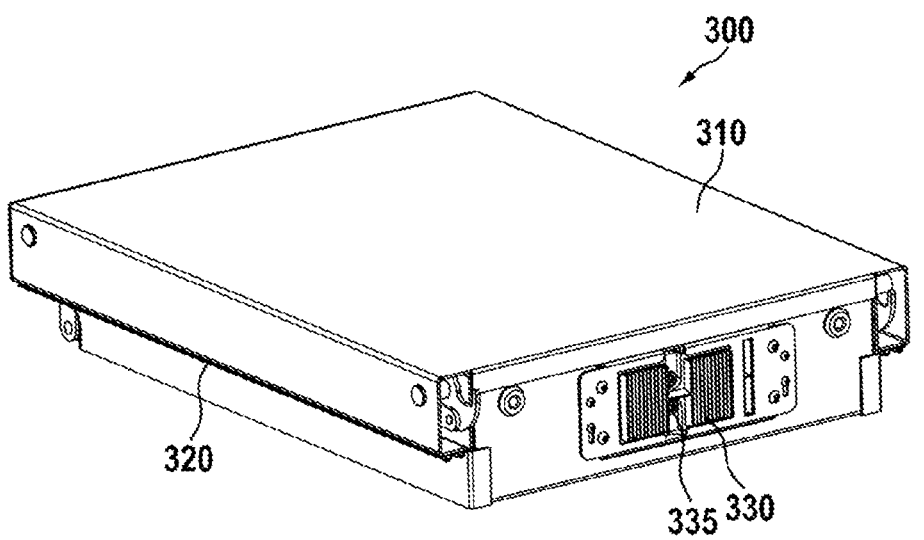
FIG. 9 shows a rear view of the housing.

In FIG. 9, a rear view of the housing 310 is shown. The rear side of the housing may include a connection panel 330 which may further include electrical connector 335 matching to or being part of the connection means 140 like high current connectors. These connectors may be automatically connected, when the battery module 300 is inserted into a rack with a storage section 110.

Figure 10:
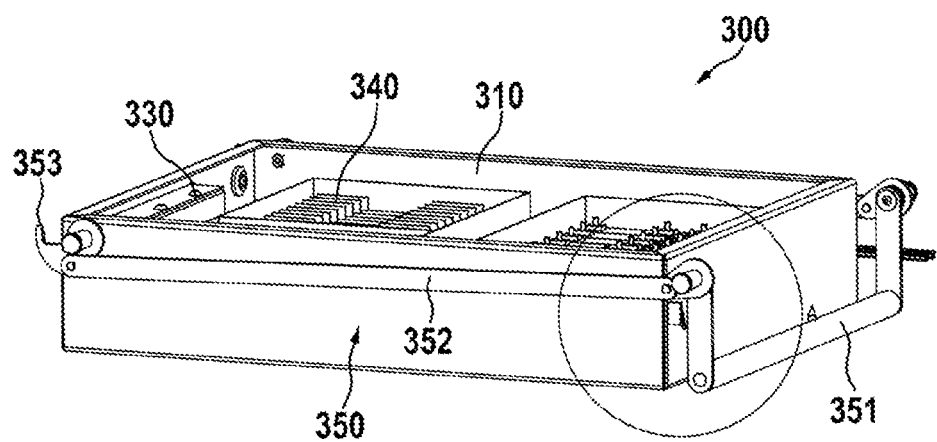
FIG. 10 shows a battery module with an open housing.

In FIG. 10, a battery module 300 with an open housing 310 is shown. It may include a plurality of battery cells 340. The battery module 300 may further have a locking mechanism 350 which may include an operating handle 351 at the front side of the housing, at least one transfer bar 352, and at least one lock 353 at the rear side of the housing. By operating the handle at the front side of the housing, a lock or a pair of locks 353 at the rear side of the housing may be operated and engage with the storage section 110, such that the housing 310 may be securely locked within the storage section 110.

Figure 11:
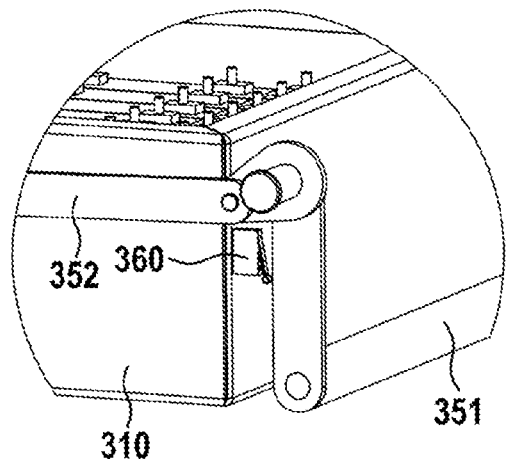
FIG. 11 shows a detail of the locking mechanism.

In FIG. 11, a detail of the locking mechanism 350 is shown. A switch 360 may be operated by the handle 351 and provides a signal that the handle housing been operated and the battery module has been locked within the storage section 110 to a controller 190, 192. Only when the controller has received a positive signal from the switch, it may switch a converter module associated to the respectively storage section 110 to an ON-state. There may also be switch coupled to the battery module itself, but this specific solution with detecting the state of a lever operating a locking mechanism offers some additional benefits. For removing the module, the locking lever must be operated. The switch is triggered and gives a signal to the controller which disables the battery even before the lever is in the fully unlocked position and before the battery can be pulled out. This allows for a safe shutdown before removing the battery.

Figure 12:
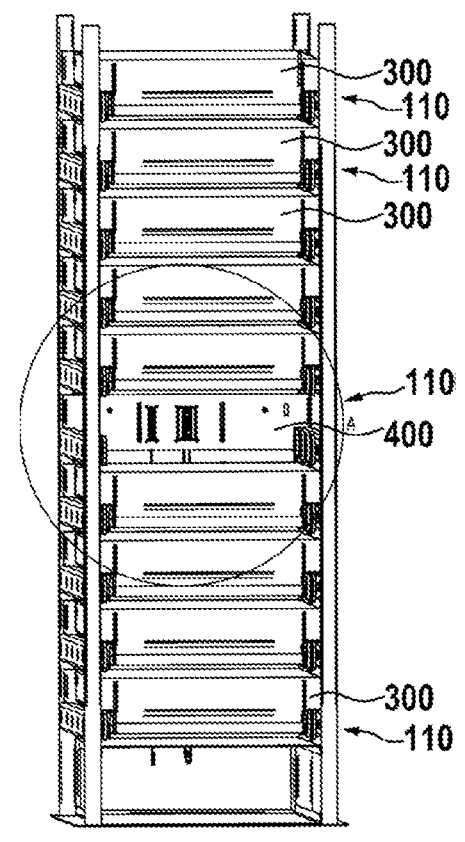
FIG. 12 shows details of a rack.

In FIG. 12, details of a rack including multiple storage sections 110 are shown. Nine of ten storage sections 110 are occupied with battery modules 300. Only one storage section is empty. At the empty storage section, a back panel 400 is shown.

Figure 13:
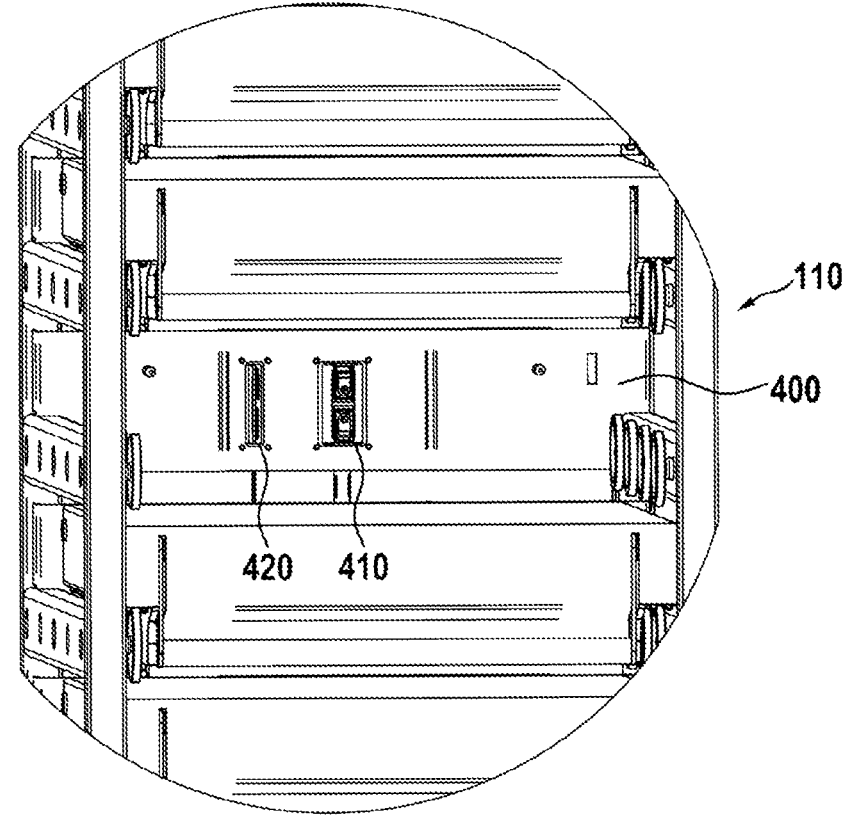
FIG. 13 shows a detail of the previous Figure.

In FIG. 13, a detail of the previous Figure is shown. Here, the back panel 400 is enlarged. The back panel 400 includes at least one power connector 410 which may be part of the connection means 140. There may also be a communication connector which may be used for communication between an internal battery module management system and a controller of the battery storage system. The back panel 400 may also include a converter module 210.

Figure 14:
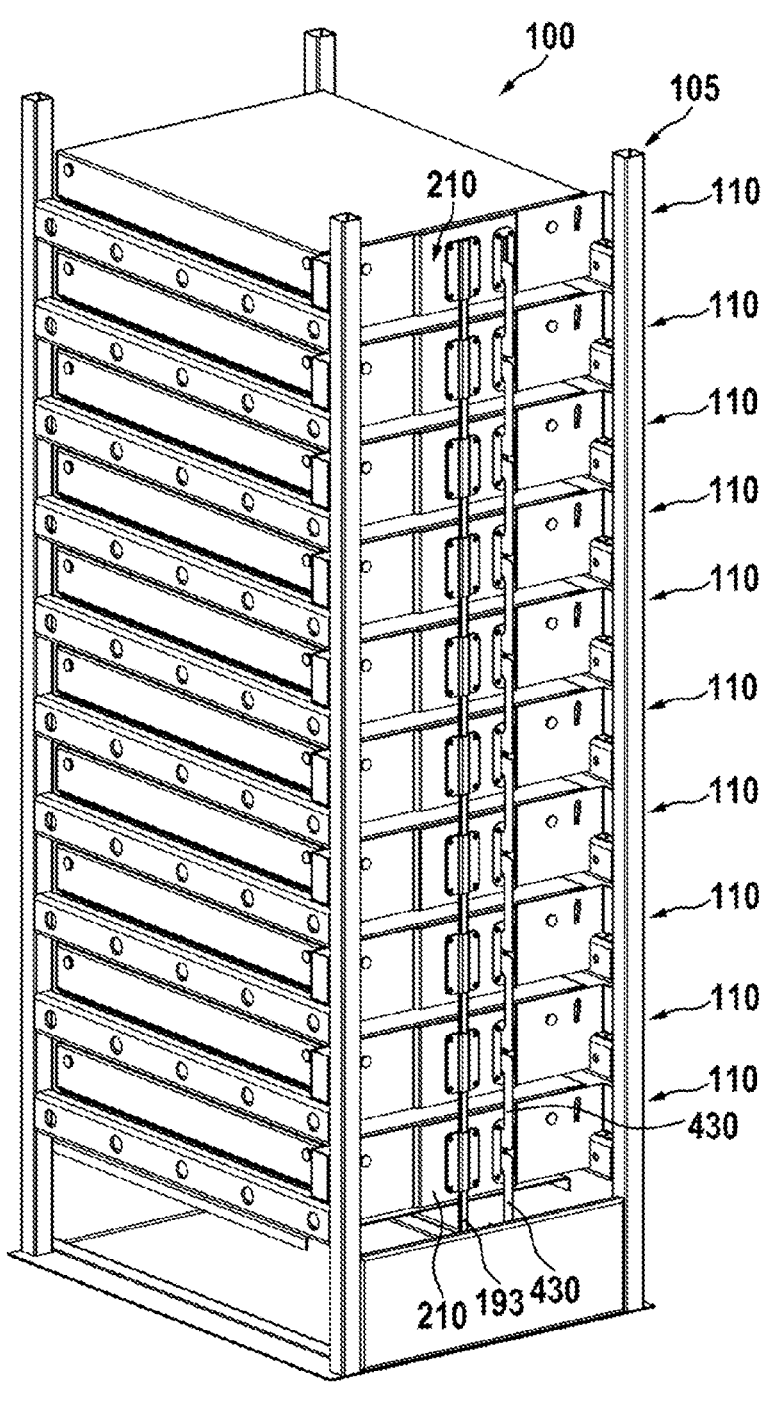
FIG. 14 shows a battery storage system in a rear view.

In FIG. 14, a battery storage system is shown in a rear view. This battery storage system includes a rack 105 with ten storage sections 110. Of course, a rack may include any other number of storage sections. Furthermore, a battery storage system may also include any other number of storage sections.

In this embodiment, each storage section includes a converter module 210. Here, only some of the converter modules are marked for clarity reasons. The converter modules 210 may be mounted to the back panels 400. They may be connected by the power connectors 410 as shown in the previous Figures automatically, when a battery is inserted. The converter modules 210 are connected by bus bars 430 which provide the connection via first module port 216 and second module port 217 between adjacent modules. Further, a communication bus based on communication lines 193 may be provided. This results in a very compact system.

Figure 15:
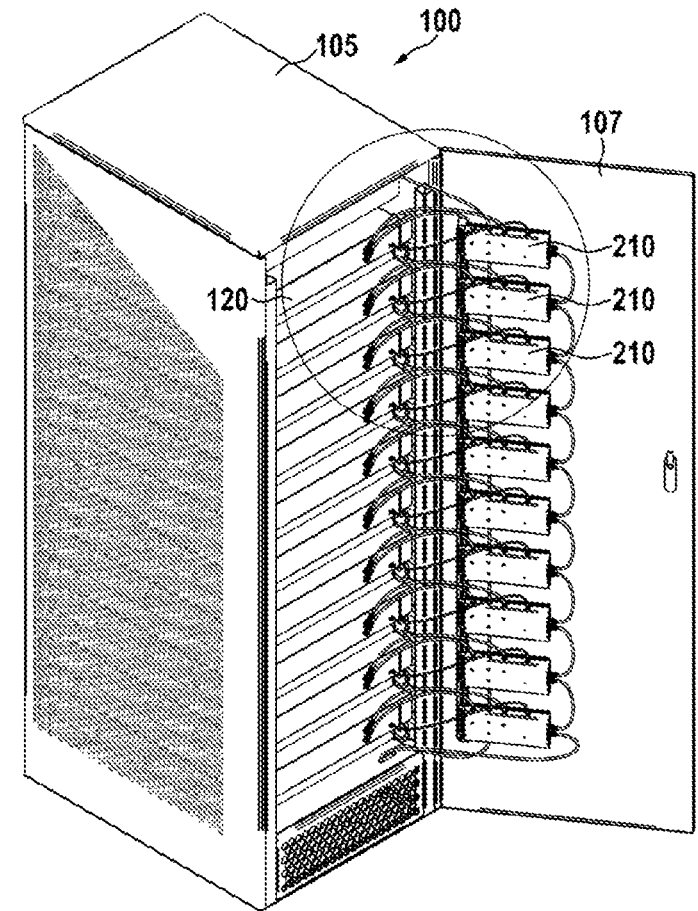
FIG. 15 shows a rack with converter modules in a door.

FIG. 15 shows a rack 105 with converter modules 210 in a door 107. Here, the converter modules 210 may be arranged close to their corresponding storage sections, which may hold batteries 120. By this way, the converter modules 210 are easily accessible, simply by opening the door of the rack. Further, the cabling to the batteries is comparatively short. When the door is open, the converter modules are moved out of the way from the batteries, such that the batteries can easily be removed or inserted into their storage sections.

Figure 16:
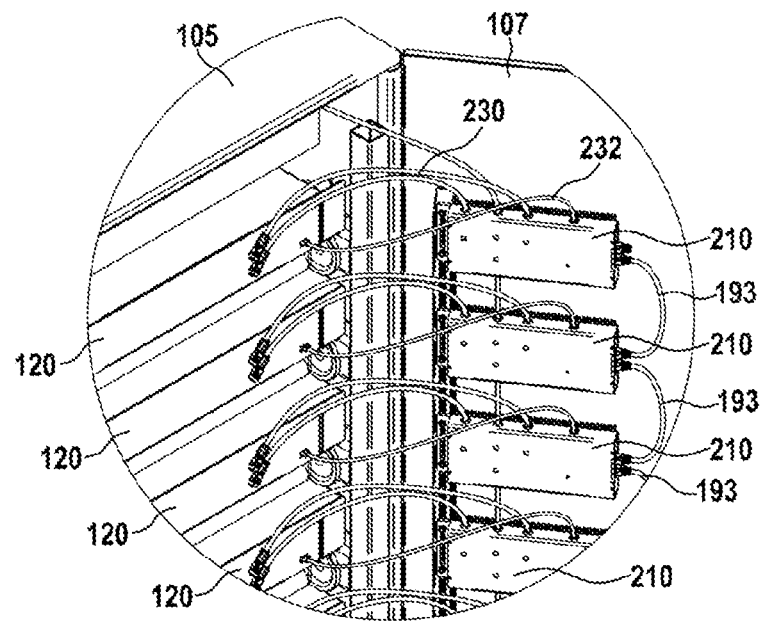
FIG. 16 shows a detail of the previous rack.

FIG. 16 shows a detail of the previous rack. In this embodiment, the converter modules contain in the same housing a sub controller 192. Here, each sub controller may be connected by a communication line 193 to another sub controller or master controller. The converter modules may be connected by power cables 230 to batteries 120. Further, sub-controllers may be connected by bus cables 232 to batteries 120 such that they may communicate with a battery management system.

Figure 17:
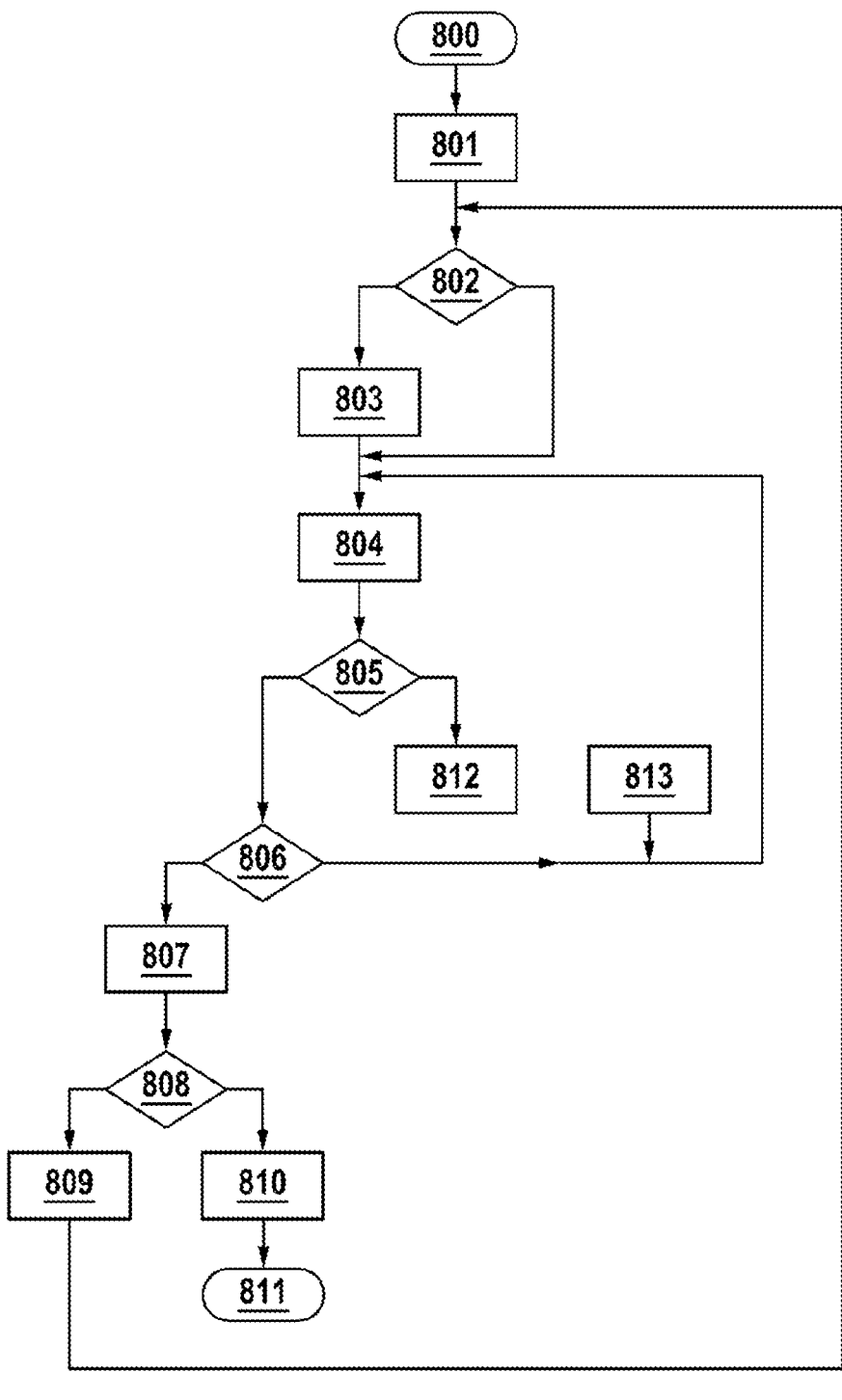
FIG. 17 shows a flow chart of a method of operating a battery storage system.

In FIG. 17, a flow chart of a method of operating a battery storage system including a multilevel converter and a plurality of storage sections is shown. The method starts at step 800.

In step 801, the system is initiated, and the number of battery modules is counted.

In step 802, the number of connected modules is checked, and/or it is checked whether a module presence detection has changed, or the number of modules has changed.

If the number of modules has changed, then step 803 is performed which integrates the new module in the system. Now the system knows that it has another module. If the number of modules has decreased, it has one module less to use for generation of a requested output voltage and/or output voltage waveform. This step is skipped if the number of modules has not changed.

In step 804, a check of health data of all batteries is done. This is the first step of a cyclic procedure. Based on this, if all modules are in safe state, then step 805 diverts to step 806, otherwise, step 812 follows. In step 806 it is check whether a battery module has to be removed. If there is no battery to be removed, then it is again proceeded to step 804 with a health check of the battery modules. If a battery has to be removed, it is checked in step 807, if the remaining number of active modules is sufficient for the required output voltage or output waveform.

If it is sufficient, then step 808 diverts to step 809 where the module to be removed is bridged or switched into an OFF-state. The procedure is continued then with step 802 for configuring the number change.

If in step 808 it has been decided that the number of active modules is not sufficient, then a system shutdown is performed, and an error message is sent to the operator in step 810. The procedure is ended with step 811.

If in step 805 it is determined that at least one module is not in a safe state, then the procedure is continued with step 812 and proceeds to step 813 which further proceeds with the health check of step 804. The procedure between steps 812 and 813 is shown in the next Figure.

Figure 18:
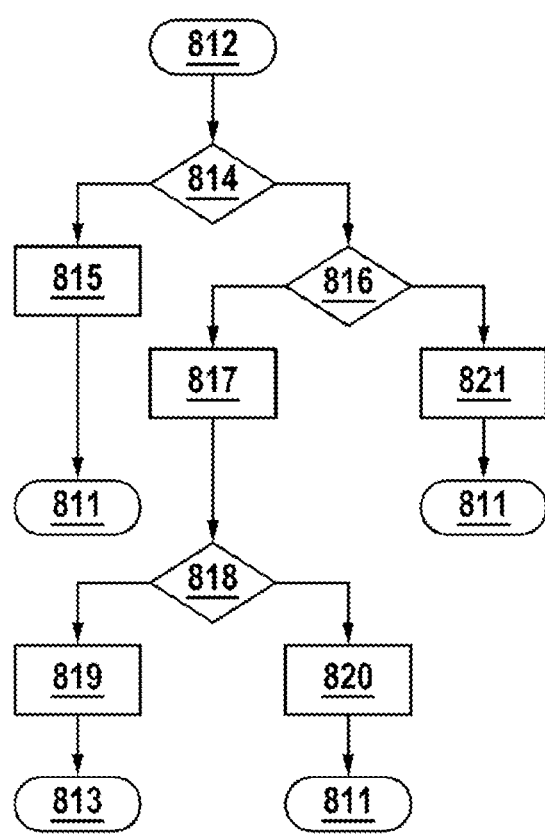
FIG. 18 shows a further flow diagram of a partial procedure.

FIG. 18 shows a further flow diagram of a partial procedure to handle an unsafe state of a module. This starts with step 812 of the previous diagram and proceeds to step 814, where it is determined whether a failure may be hazardous for people and/or environment. If this failure is hazardous, then step 815 makes a system shutdown and sends an alarm message to the operator. The program is ended in step 811.

If step 814 determines that the failure is not hazardous, then the procedure proceeds with step 816 which checks whether an uninterrupted operation mode is active. If this is not active, it continues with step 821 resulting in a system shutdown and sending of an error message to the operator. Finally, the program is terminated in step 811. Step 816 may be omitted such that step 811 follows on step 814.

If an uninterrupted operation mode is active in step 816, it is checked whether the remaining numbers of active modules are sufficient for the required output voltage and/or waveform. If it is sufficient, step 818 diverts to step 819 to disable the defective module and continue with step 813 which goes back to the diagram of the previous Figure.

If the module number is determined as not sufficient in step 818, it diverts to step 820 resulting in a system shutdown and sending an error message to the operator with finally terminating the program in step 811.

It will be appreciated to those skilled in the art having the benefit of this disclosure that this invention is believed to provide a modular battery storage system. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 battery storage system
105 rack
107 door
110 storage section
120 battery
130 holding means
140 electrical connection means
180 means for detecting the presence of a battery
190 controller
191 master controller
192 sub controller
193 communication lines
200 multilevel converter
210 converter module
212 bypass switch
213 bypass current
214 battery switch
215 battery current
216 first module port
217 second module port
222 first port
224 second port
230 power cables
232 bus cables
300 battery module
310 housing
320 slide rails
330 connection panel
335 connector
340 battery cells
350 locking mechanism
351 handle
352 transfer bar
353 lock
400 backplane
410 power connector
420 communication connector
430 bus bar
800-821 flow diagram steps
The invention claimed is:

1. A battery storage system comprising a multilevel-converter and a plurality of storage sections,
   wherein each storage section comprises
   at least one mechanical support structure configured to hold at least one battery and
   at least one electrical member for electrically connecting the at least one battery to a corresponding converter module of the multilevel-converter,
   and wherein the multilevel-converter comprises a plurality of converter modules connected in series with each other, wherein at least one of the converter modules of the plurality of the converter modules is operably associated with at least one of the storage sections of the plurality of the storage sections,
   each of the converter modules of the plurality of converter modules comprising at least one bypass switch configured to bypass the at least one battery and at least a battery switch configured to disconnect the at least one battery at the same time when the at least one bypass switch bypasses the at least one battery,
   the battery storage system further comprising (i) a controller that has an electronic circuitry configured to detect presence of the at least one battery in each storage section of the plurality of the storage sections and generate a signal indicative of such presence and (ii) means for configuring switches of the plurality of the converter modules based on the signal indicative of the presence of said at least one battery.

2. A battery storage system according to claim 1, wherein each of the plurality of the converter modules has at least:
   (i) an ON state, in which the at least one bypass switch is open and the at least one battery switch is closed, and
   (ii) an OFF state, in which the at least one bypass switch is closed to bypass the at least one battery and the at least one battery switch is open.

3. A battery storage system according to claim 1, wherein the controller is configured to switch a converter module of said plurality to the OFF state if at a storage section associated with the converter module no presence of the at least one battery has been detected.

4. A battery storage system according to claim 1, wherein the electronic circuitry is configured to detect an electrical connection between the at least one battery and a converter module of said plurality of converter modules.

5. A battery storage system according to claim 1, wherein at least one storage section of the plurality of storage sections has the electronic circuitry that includes at least one of:
   a voltage measurement means configured to measure a battery voltage and generate the signal indicative of the presence of the battery,
   a weight detection means configured to detect a battery mass,
   a volume detection means configured to detect a battery volume, and
   an optical detection means configured to detect a battery appearance or marking.

6. A battery storage system according to claim 1, wherein the controller is configured to communicate with at least one battery management system included in the at least one battery.

7. A battery storage system according to claim 6, wherein the controller is configured to communicate battery health data and/or battery operation data with the at least one battery management system.

8. A battery storage system according to claim 1, wherein at least one storage section of the plurality of storage sections contains a communication connector that is configured to provide communication between an internal battery module management system of the at least one battery and the controller.

9. A battery storage system according to claim 1, wherein at least one storage section of the plurality of storage sections includes at least one of a means for affixing the at least one battery to the storage section and a tray configured to hold said at least one battery.

10. A battery storage system according to claim 1, wherein the at least one electrical member comprises at least one of a cable with at least one connector, a current bar, and a printed circuit board.

11. A battery storage system according to claim 1, wherein the plurality of the storage sections is held by a rack and the plurality of associated converter modules is held within a door of the rack.

12. A battery storage system according to claim 1, wherein the means configure the switches of the plurality of the converter modules based on the signal indicative of the presence of said at least one battery such that the plurality of the converter modules provides a required voltage.

13. A method of operating a battery storage system that includes a multilevel converter including a plurality of converter modules and a plurality of storage sections configured to hold at least one battery, the method comprising the steps of:

a) assigning at least one converter module of said plurality of converter modules to at least one storage section of said plurality of storage sections, b) switching each multilevel converter to an OFF state, c) identifying storage sections occupied with the at least one battery, d) obtaining battery data including at least a battery voltage of storage sections having the at least one battery, e) checking whether a total voltage of all storage sections with the at least one battery exceeds a required minimum output voltage, f) then operating the multilevel converter if said total voltage exceeds the required minimum output voltage, g) else stopping if said total voltage does not exceed the required minimum voltage.

14. A method of operating a battery storage system according to claim 13, the method comprising: if said operating the multilevel converter is implemented in step f), repeating a loop including steps c) to f).

15. A method of operating a battery storage system according to claim 13, further including the steps of:

querying periodically and/or checking periodically at least one means for detecting presence of the at least one battery in the at least one storage section of the purality of the storage sections, and, if a status of a said at least one storage section changes from present to absent, immediately setting the converter module of said at least one storage section to an OFF state.

16. A method of operating a battery storage system according to claim 13, wherein the step d) includes:

querying periodically and/or checking periodically at least one operating parameter of the at least one battery in the at least one storage section, the at least one operating parameter including at least one of a state of health, a state of charge, a voltage, and a current, and if the at least one of the operating parameter falls out of predetermined limits, setting the at least one converter module of said at least one storage section to an OFF state.

* * * * *